United States Patent
Rudd

(10) Patent No.: US 7,426,612 B2
(45) Date of Patent: Sep. 16, 2008

(54) METHODS AND APPARATUS FOR ENFORCING INSTRUCTION-CACHE COHERENCE

(75) Inventor: Kevin Rudd, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 554 days.

(21) Appl. No.: 10/881,394

(22) Filed: Jun. 30, 2004

(65) Prior Publication Data

US 2006/0036809 A1    Feb. 16, 2006

(51) Int. Cl.
*G06F 12/00* (2006.01)
*G06F 12/12* (2006.01)

(52) U.S. Cl. .................. 711/141; 711/125; 711/133; 711/137

(58) Field of Classification Search ................ 711/133, 711/141, 125, 137
See application file for complete search history.

(56) References Cited

U.S. PATENT DOCUMENTS

| | | | |
|---|---|---|---|
| 5,249,283 A * | 9/1993 | Boland | 711/146 |
| 5,748,976 A * | 5/1998 | Taylor | 712/240 |
| 5,822,765 A * | 10/1998 | Boatright et al. | 711/146 |
| 5,903,911 A * | 5/1999 | Gaskins | 711/141 |
| 6,032,270 A * | 2/2000 | Furukawa et al. | 714/49 |
| 6,345,339 B1 * | 2/2002 | Arimilli et al. | 711/141 |
| 6,574,725 B1 * | 6/2003 | Kranich et al. | 712/31 |
| 2003/0084229 A1 * | 5/2003 | Ho et al. | 711/102 |
| 2003/0217235 A1 * | 11/2003 | Rowlands | 711/141 |
| 2005/0154866 A1 * | 7/2005 | Steely et al. | 712/228 |

FOREIGN PATENT DOCUMENTS

JP    11272556 A * 10/1999

* cited by examiner

*Primary Examiner*—Matt Kim
*Assistant Examiner*—Michael C Krofcheck
(74) *Attorney, Agent, or Firm*—Hanley, Flight & Zimmerman, LLC.

(57) ABSTRACT

Methods and apparatus for enforcing instruction-cache coherence are described herein. In an example method, a memory region of an instruction cache is initialized to form an initialized memory region prior to generating new code associated with the initialized memory region. Coherence code associated with the initialized memory region is generated. The new code associated with the initialized memory is generated. At least one of the new code and the coherence code is executed. Other embodiments may be described and claimed.

30 Claims, 5 Drawing Sheets

360 ↴

{ .bbb
    br.call b1 = fixup
    nop.b
    nop.b
}

370 ↴

{ .mlx
    nop.m
    brl.call b1 = fixup
}

METHODS AND APPARATUS FOR ENFORCING INSTRUCTION-CACHE COHERENCE

TECHNICAL FIELD

The present disclosure relates generally to processor systems, and more particularly, to methods and apparatus for enforcing instruction-cache coherence.

BACKGROUND

In general, a processor system typically includes a main memory and a processor. The processor system may also include a cache memory to serve as a buffer memory between the main memory and the processor. The cache memory includes a data cache and an instruction cache directly accessible by the processor. The data cache is a portion of the cache memory that stores data accessible by instructions of a program executable by the processor, and the instruction cache is another portion of the cache memory that stores those instructions.

A protocol known as cache coherence is typically used to manage the data cache so that all cores and/or processors within a coherence domain (e.g., a processor having multiple cores or a processor system having multiple processors) may access the same value of a particular memory address. Data caches are maintained to be coherent both within a processor and/or across all processors in a multiple-processor system. A cache coherence protocol ensures that changes in the value of shared data on, for example, one processor are available and/or accessible throughout the entire processor system. In particular, cache coherence may be maintained by propagating the latest value or by invalidating incoherent copies of an old value (or all copies of the old value) in data caches.

In some processor systems, code may be dynamically generated using load and store instructions (i.e., new code) during a code generation process. For example, the code generation process may include a dynamic optimizer, an interpreter, and/or a just-in-time (JIT) compiler associated with a managed runtime environment (MRTE) for translating and/or converting bytecode (e.g., computer object code associated with a program written in a particular source code such as C or C++) into platform-specific executable code for an underlying processor to execute (e.g., native machine language instructions). However, without explicit direction, instruction caches may not be coherent between processors or within the same processor and/or processor system. As a result, the new code may not be propagated throughout the instruction caches and, thus, may not be observed by some cores and/or processors, including the generating processor, before cache coherence is enforced.

To increase performance, processor systems implemented using, for example, the Intel® Itanium® technology may not guarantee that instruction caches are coherent without explicit software control. In processor systems based on the Intel® Itanium® technology, a flush-cache instruction (e.g., fc) may be used to enforce instruction-cache coherence. In particular, the flush-cache instruction may flush data associated with a particular memory address from all caches associated with a core and/or a processor. The particular code sequence (e.g., the flush-cache instruction) required to ensure coherence is architecturally-specified and dependent on the nature of the code changes and the sharing of instructions across multiple cores and/or processors in a processor system. Different code sequences are necessary because of the different coherence requirements within a core/processor and/or between cores/processors. For example, a set of code sequences may be associated with self-modifying code (SMC) to ensure coherence within a core while another set of code sequences may be associated with cross-modifying code (CMC) to ensure coherence across all cores in a processor system. For processors implemented using the Intel® Itanium® technology, additional information pertinent to the code sequences is available in the Itanium® Software Developer's Manual, vol. 2 (October 2002) developed by Intel® Corporation. Processors implemented using other processing technology may have other requirements to ensure coherence. Further, the noted code sequences are typically executed to perform a cache flush during the code generation process. Thus, the code sequences require coordination between the different processors involved and create undesirable latency to enforce instruction-cache coherence.

DETAILED DESCRIPTION

In general, example methods and apparatus for enforcing instruction-cache coherence are described herein. Typically, in existing systems (e.g., a processor system implemented using the Intel® Itanium® technology), a cache flush is performed on an instruction cache after generating new code and before executing the newly generated code. In contrast to existing systems, the example methods and apparatus disclosed herein speculatively perform the cache flush before generating new code and, if necessary, executing the newly generated code. Alternatively, the methods and apparatus disclosed herein may execute coherence code (e.g., call to fix-up code) to enforce coherency and enable execution of the newly generated code. As a result, coherency of the instruction cache may be maintained for application and/or execution environments, including a code generation process such as, for example, an MRTE. Thus, the coherency of the instruction cache may be maintained without hardware control and continue to operate properly (i.e., as if the instruction cache is maintained to be coherent with the memory by hardware control).

Figure 1:
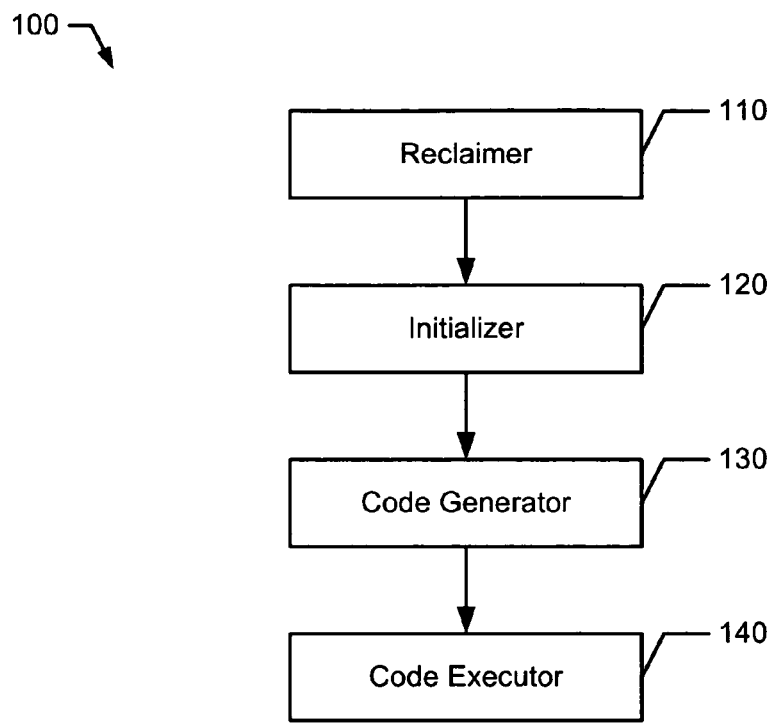
FIG. 1 is a block diagram representation of an example cache coherence enforcement system according to an embodiment of the methods and apparatus disclosed herein.

Referring to FIG. 1, an example cache coherence enforcement system 100 includes a reclaimer 110, an initializer 120, a code generator 130, and a code executor 140 as described herein. In general, the reclaimer 110 and the initializer 120 may reclaim and initialize a code page of an instruction cache so that the code page is available for use by the code generator 130. The code generator 130 may generate new code to be executed. The code executor 140 may execute the newly generated code. Further, the code executor 140 may also call fix-up code to ensure that any core can see the newly generated code if the locally-cached copy of memory corresponding to the newly generated code is locally incoherent when it is first executed.

Figure 2:
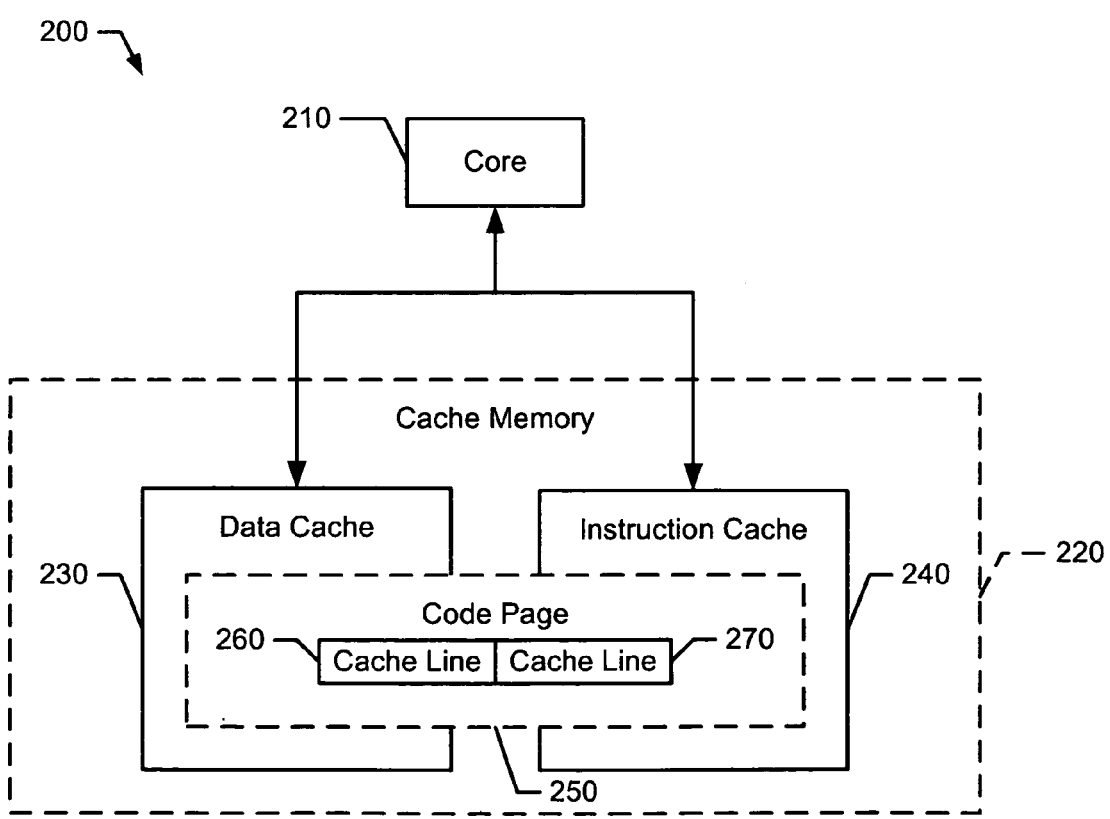
FIG. 2 is a block diagram representation of an example processor system associated with the example cache coherence enforcement system of FIG. 1.

The cache coherence enforcement system 100 may be implemented on a processor system 200 as illustrated in FIG. 2. In the example of FIG. 2, the processor system 200 includes one or more processors and cores, generally shown as core 210, and a cache memory 220. Although the processor system 200 is depicted in FIG. 2 as including one core (e.g., the core 210), the processor system 200 may include two or more cores and/or processors. The core 210 is communicatively coupled to the cache memory 220 in a known manner. The cache memory 220 includes a data cache 230 and an instruction cache 240. Further, the cache memory 220 serves as a buffer memory between the core 210 and an external memory (e.g., the main memory 2030 of FIG. 9). Data and/or code may be copied from the external memory into the cache memory 220 for direct access by the core 210 to increase throughput. Typically, the instruction cache 240 is a portion of the cache memory 210 that stores instructions of a program to be executed by the core 210 and the data cache 230 is a portion of the cache memory 220 that stores data accessible by the program instructions. As used herein the term "code page" refers to one or more regions of a cache memory (e.g., the cache memory 220) that store code and/or extra code data (e.g., metadata). The cache memory 220 may be configured to include one or more cache lines, generally shown as 260 and 270, distributed across the cache memory 220. In processor systems implemented using Intel® Itanium® technology, for example, each cache line may be composed of 32 bytes or 64 bytes. In another example, each cache line of processor systems implemented using Intel® Itanium® 2 technology may be composed of 64 bytes or 128 bytes. The data cache 230 and the instruction cache 240 may not contain the same cache line. For example, the cache line 260 may be associated with the data cache 230 and the cache line 270 may be associated with the instruction cache 240. Although the cache lines 260 and 270 may correspond to the same memory addresses, the cache line 270 may not necessarily be coherent with the cache line 260. That is, the cache line 270 may not store the same data and/or code values as the cache line 260. The code page 250 may occupy one or more cache lines of the cache memory 220 without being entirely contained in the data cache 230 and/or the instruction cache 240. For example, the code page 250 may range from one kilobyte to four kilobytes. The code page 250 may vary in size and/or alignment to implement the methods and apparatus disclosed herein.

To optimize execution of instructions, code pages may be linked directly to each other rather than implementing a transition from one code page back to the execution environment (e.g., MRTE) to determine the next code page. For example, instructions associated with the code page 250 may be linked to instructions associated with another code page. Thus, the core 210 may disable the code page 250, perform any updates to the links in one or more source code pages, and maintain coherence across all code pages following these updates.

In particular, the core 210 is configured to generate code (e.g., via a code generation process). To avoid executing old code (e.g., outdated, invalid, and/or stale code), the cache memory 220 (e.g., the data cache 230 and/or the instruction cache 240) is flushed following the code generation process performed by the core 210. A protocol to enforce cache coherency may be used to manage the cache memory 220 so that all cores and/or processors within a coherence domain (e.g., associated with a processor having multiple cores or a processor system having multiple processors) may access the same data and/or code values regardless of whether the data is stored in the cache memory 220 and/or in the external memory. Typically, all data caches such as the data cache 230 are coherent within the core 210 and across all cores and/or processors in the same coherence domain of the processor system 200. Thus, newly generated data is available immediately to all cores and/or processors without software intervention. In contrast to data caches, instruction caches such as the instruction cache 240 may not be coherent unless specific instruction sequences have been executed. As a result, newly generated code may not be available to all cores and/or processors within the coherence domain, including the core that generated the new code, before instruction-cache coherence is enforced by executing an appropriate instruction sequence.

Figures 3, 4:
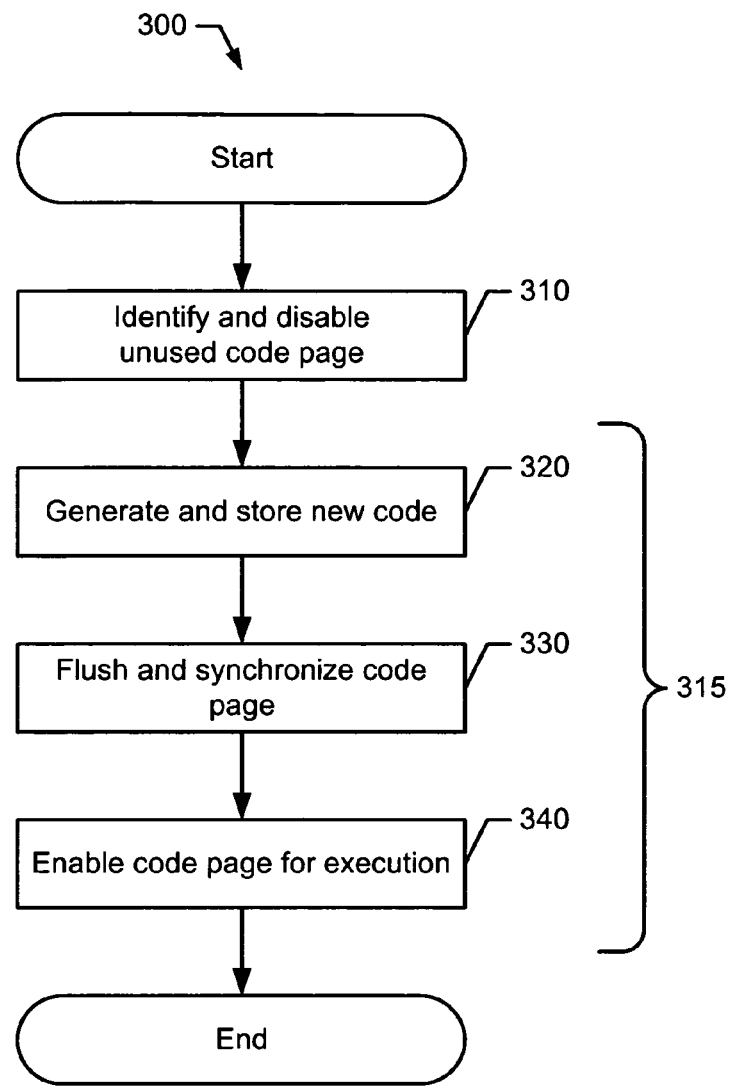
FIG. 3 depicts a known manner of enforcing instruction-cache coherence.
FIG. 4 is a code representation of example instruction bundles associated with the example cache coherence enforcement system of FIG. 1.

FIG. 3 depicts a process 300 of a known manner of enforcing instruction-cache coherence. Although the processor system 200 is configured to operate in a manner as described in the processes 400, 410, and 420 shown in FIGS. 5, 7, and 8, respectively, the processor system 200 may be also used as an example to describe the functions associated with enforcing instruction-cache coherence in existing systems as illustrated in the known process 300. In particular, the process 300 begins with the core 210 reclaiming a code page (e.g., the code page 250 of FIG. 2) previously used by old code for a code generation process 315 to generate and store new code (block 310). The core 210 may identify the code page 250 as invalid and disable the code page 250.

The code generation process 315 may begin with the core 210 generating new code and storing the new code in the code page 250 (block 320). For example, the code generation process 315 may include a dynamic optimizer, an interpreter, and/or a just-in-time (JIT) compiler of a managed runtime environment (MRTE) for translating and/or converting bytecodes (e.g., computer object code associated with a program written in a particular source code such as C and C++) into platform-specific executable code for the processor system 200 to execute (e.g., native machine language instructions). Although the core 210 stores the newly generated code, the core 210 may not be able to use the newly generated code immediately because outdated code may not have been removed from the instruction cache 240 by a coherence mechanism (e.g., a flush-cache instruction). To remove outdated code from the instruction cache 240, the core 210 may execute instructions to flush and synchronize the code page 250 (block 330) to enable the code page to store and execute the new code (block 340). For example, a flush-cache instruction (e.g., fc) may be used to enforce instruction-cache coherence. A code sequence associated with self-modifying code (SMC) may be used to ensure coherence within the core 210 and/or another code sequence associated with cross-modifying code (CMC) may be used to ensure coherence across all cores in a multiple-processor system. In this manner, the core 210 avoids executing stale and/or invalid code. The cache flush and synchronization of the code page 250 is performed after the new code is generated at block 320 because the core 210 may prefetch instruction(s) into the instruction cache 240 at any time. However, by performing the cache flush after the new code is generated in the code generation process 315, to enforce coherence of the instruction cache 240 the core 210 creates an undesirable latency associated with code generation and execution.

In contrast to the instruction-cache coherence enforcement technique of existing systems as described above in connection with FIG. 3, the cache coherence enforcement system 100 may be configured to speculatively perform cache flushes prior to a code generation process (e.g., the code generation process 420 of FIGS. 5 and 8) so that newly generated code may be executed immediately after the code generation process is complete. As described herein, the instruction-cache coherence mechanism of the example system 100 removes the cache flushing operation from the critical path of the code generation process 420. In particular, the cache coherence enforcement system 100 may flush and synchronize the code page 250 before the core 210 generates new code (e.g., the flush and synchronization operation 630 of FIG. 7). Thus, some or all of the latency associated with the code generation and subsequent coherence actions for the instruction cache 240 (e.g., latency between when instructions are generated and when some or all of those instructions may be fetched and executed) may be hidden from, for example, the code generation process 420, the execution process 425, and/or other related processes.

Referring back to FIG. 1, in an example embodiment of the methods and apparatus described herein, the reclaimer 110 reclaims the code page 250 and/or another portion of the main memory (e.g., the main memory 2030 of FIG. 9) contained in the instruction cache 240, both which may include old code. The reclaimer 110 marks the code page 250 as invalid for execution and disables the code page 250 from execution by the core 210 in a known manner. At this point, the cache line 270 associated with the instruction cache 240 may not be coherent with the corresponding cache line 260 associated with the data cache 230. The initializer 120 initializes the code page 250 reclaimed by the reclaimer 110 with any default state and safe instructions at all branch-entry points (e.g., a branch-entry point of an application may include a call instruction such as a jump-and-link or a jump-and-link-register instruction to branch to another application). In particular, the initializer 120 may generate either a new code sequence or a fix-up code sequence at every branch target (e.g., a memory address indicated by a call instruction). Further, the initializer 120 may ensure that all cache lines 260 and 270 corresponding to the code page 250 are flushed from all caches in the coherence domain (e.g., the data cache 230 and the instruction cache 240). In response to the instruction cache 240 including a fix-up code sequence which may be incoherent with the main memory 2030, the core 210 may execute the fix-up code sequence (e.g., the instructions in bundle 360 or 370 of FIG. 4) to enforce coherence of the cache line with the main memory 2030 to ensure that the instruction cache 240 includes coherent and valid code. Following the above-described reclamation and initialization operations, the code page 250 is available for use by the code generator 130 (FIG. 1) without subsequent explicit coherence actions until an incoherent instruction cache line (e.g., the cache line 270) is detected.

The code generator 130 may generate new code to be executed and to replace the existing fix-up code from the initializer 120. If present in an instruction cache line (e.g., the cache line 270) when that cache line is executed, the fix-up code sequence may ensure that any core can see the newly generated code even if the newly generated code is incoherent when it is first executed. For example, the code generator 130 may be a dynamic optimizer, an interpreter, a JIT compiler, etc. The code generator 130 may also enable the code page 250 for execution by the code executor 140. Alternatively, the core 210 may process an error condition if the memory associated with the instruction cache line fails to include valid code and the cache line including fix-up code from the initializer 120 is executed in error.

Typically, a processor system implemented using the Intel® Itanium® technology receives instructions in bundles (e.g., bundles 360 and 370 of FIG. 4). In a processor system implemented using the Intel® Itanium® technology, for example, a bundle may include 128 bits having three 41-bit slots (e.g., slot 0, slot 1, and slot 2) and one 5-bit template. Each slot may include an instruction, and the template defines the manner in which the three instructions may be interpreted by the processor.

For a processor system implemented using the Intel® Itanium® technology, three instructions are packaged into a known alignment such as for example, 128-bit bundles, to provide good code density and to decrease the complexity of decoding circuitry of a processor system implemented using the Intel® Itanium® technology. Alternatively, a bundle may include a single instruction. Further, instructions for other processing architectures may be grouped in other manners or may not be grouped at all. For example, instructions for other processors may have a fixed or variable width.

For a processor system implemented using the Intel® Itanium® technology, a safe bundle is a bundle that ensures correct execution under any condition (e.g., the safe bundle ensures coherence in the instruction cache 240). The safe bundle may also include instructions that can transparently execute fix-up code to maintain coherence of the instruction cache 240 (e.g., a call to the fix-up code at a branch-entry point). In addition, a bundle may include generated instructions that are executable. On some processor systems (e.g., processor systems implemented using the Intel® Itanium® technology), branch-entry points may be restricted to the granularity of a 16-byte bundle. Typically, the code executor 140 starts at slot 0 to execute a first bundle. If a branch instruction (e.g., a call to the fix-up code such as the instruction bundle 360 of FIG. 4) is at slot 0 of the first bundle, then the code executor 140 does not execute the instructions at slots 1 and 2 of the first bundle. In particular, the code executor 140 may begin executing slot 0 of a second bundle (e.g., the branch target) because the slot 0 of the first bundle is a branch instruction. If the branch instruction is a call to a subroutine, then the code executor 140 may return to slot 0 of a third bundle (e.g., typically, the next bundle following the bundle including the subroutine call) after executing a return-from-subroutine instruction. Thus, the fix-up code or the new code generated by the code generator 130 may not branch into the middle of any bundle. Accordingly, a call to the fix-up code may be inserted into slot 0 of the safe bundle without requiring any change to slots 1 and 2 of the safe bundle. A call to fix-up code may also be placed in either slot 1 and/or slot 2 of the safe bundle (e.g., a long call to the fix-up code such as the instruction bundle 370 of FIG. 4) as long as the safe bundle is updated safely such that the safe bundle cannot be executed if the safe bundle is incomplete. This safe-bundle update may be performed using an atomic store to write the entire bundle at one time.

Figures 5, 6:
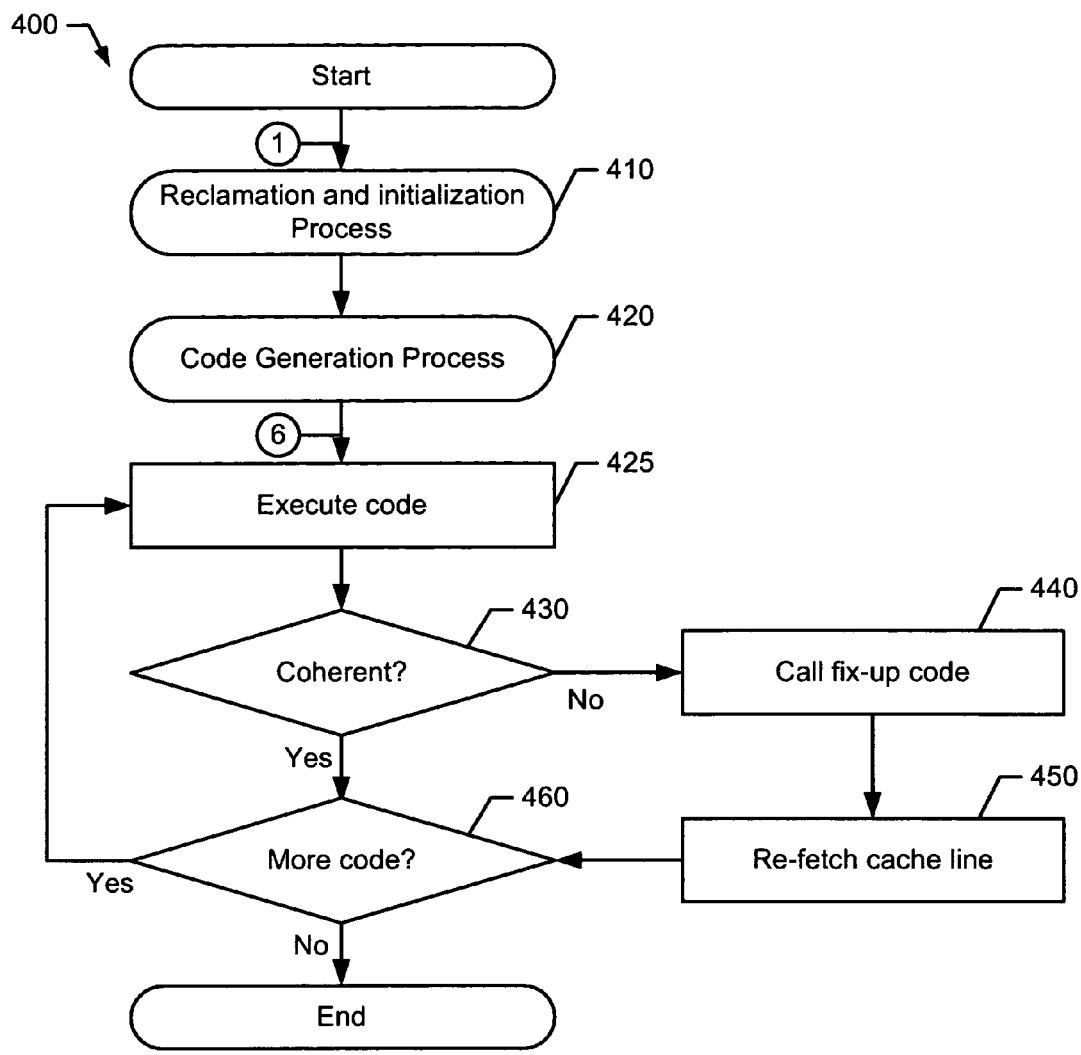
FIG. 5 depicts one manner in which the example cache coherence enforcement system of FIG. 1 may be configured.
FIG. 6 depicts a code state table associated with the example cache coherence enforcement system of FIG. 1.
Figure 7:
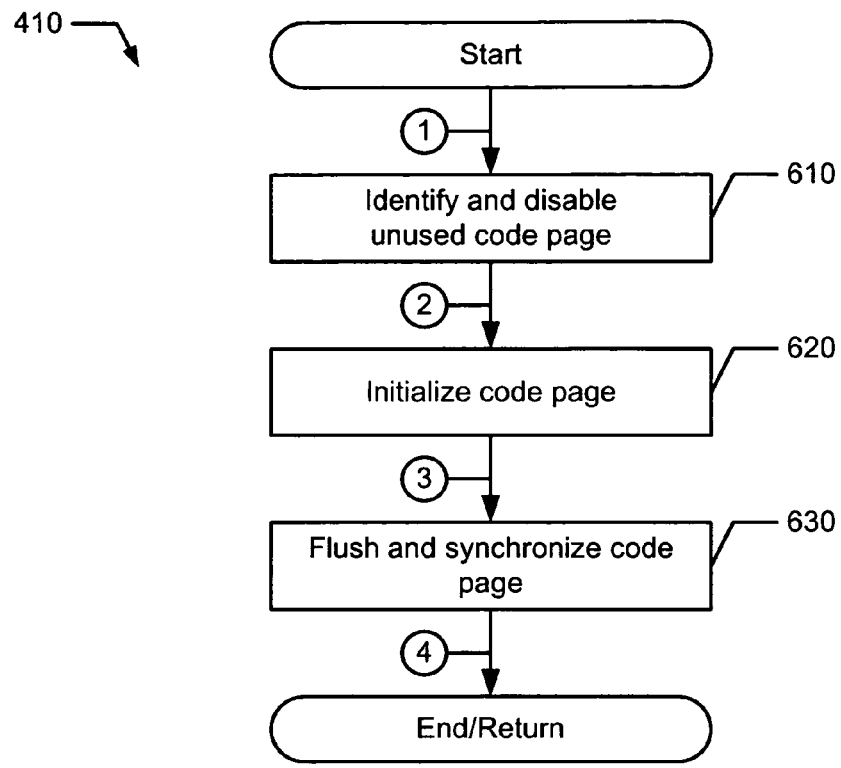
FIG. 7 depicts one manner in which the example cache coherence enforcement system of FIG. 1 may be configured to implement an example reclamation and initialization process.
Figure 8:
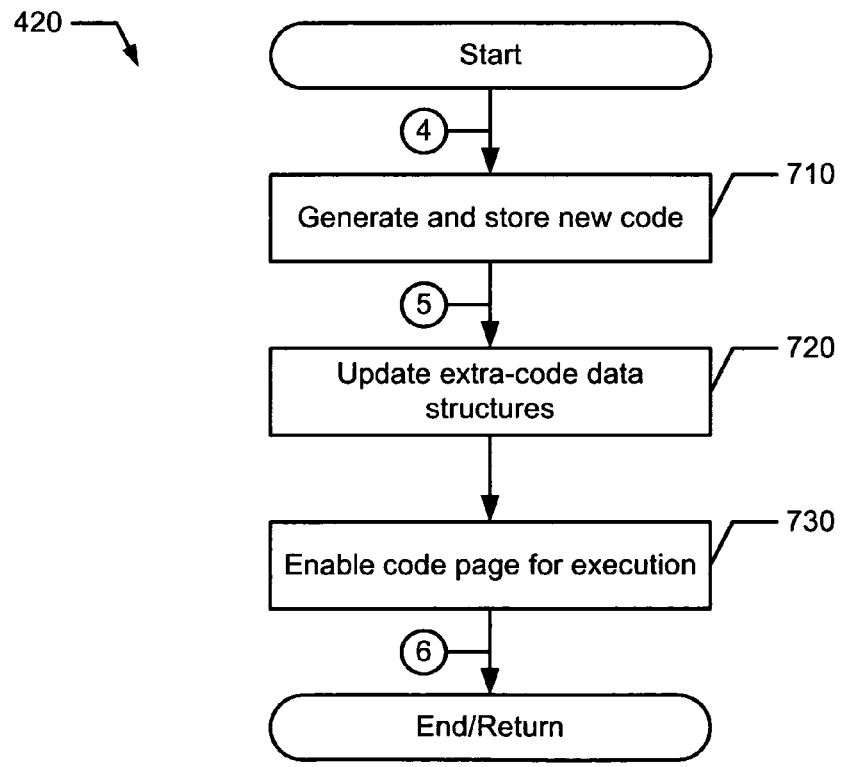
FIG. 8 depicts one manner in which the example cache coherence enforcement system of FIG. 1 may be configured to implement an example code generation process.

FIGS. 5, 7, and 8 depict one manner in which the example system 100 of FIG. 1 may be configured to enforce instruction-cache coherence. The example processes of FIGS. 5, 7, and 8 may be implemented as machine accessible instructions utilizing any of many different programming codes stored on any combination of machine-accessible media such as a volatile or nonvolatile memory or other mass storage device (e.g., a floppy disk, a CD, and a DVD). For example, machine accessible instructions may be embodied in a machine-accessible medium such as an erasable programmable read only memory (EPROM), a read only memory (ROM), a random access memory (RAM), a magnetic media, an optical media, and/or any other suitable type of medium. Alternatively, the machine accessible instructions may be embodied in a programmable gate array and/or an application specific integrated circuit (ASIC). Further, although a particular order of actions is illustrated in FIGS. 5, 7, and 8, these actions can be performed in other temporal sequences. Again, the processes 400, 410, and 420 are merely provided and described in conjunction with the components of FIGS. 1 and 2 as an example of one way to configure a system to enforce instruction-cache coherence. In addition, an example code-state table 500 illustrated in FIG. 6 describes the code states of a code page associated with the processes 400, 410, and 420.

In the example of FIG. 5, the process 400 includes a reclamation and initialization process 410 (e.g., garbage collection) and a code generation process 420. Prior to performance of the reclamation and initialization process 410, the code page 250 is in Code State No. 1 of the code-state table 500 of FIG. 6. In particular, in Code State No. 1, the code page 250 may include safe old code that is enabled for execution by the code executor 140 (e.g., valid for execution) (FIG. 1). The core 210 may initiate the reclamation and initialization process 410 if the number of code pages available for the code generation process 420 falls below a code-page threshold or a desired number of code pages.

Referring to FIG. 7, the reclamation and initialization process 410 begins with the reclaimer 110 reclaiming an unused code page (block 610). As noted above, the code page 250 may be a portion of the instruction cache 240 used to store code generated by the code generator 130 for execution by the code executor 140. In particular, the reclaimer 110 identifies the code page 250 as invalid and stops all cores and/or processors from using the code page 250. At this point, the code page is in Code State No. 2 in which the code page 250 may include unsafe old code that is disabled for execution by the code executor 140. The initializer 120 then initializes the code page 250 (block 620). For example, the initializing unit 120 may reset the code page 250 to default, which may include fix-up code. As a result of the initialization operation (block 620), the code page 250 enters Code State No. 3. In Code State No. 3, the code page 250 may include a combination of unsafe old code and safe fix-up code that has been disabled for execution by the code executor 140. When the code generator 130 replaces all bundles in the code page 250 with safe fix-up code, any incoherent unsafe old code may be removed along with any safe fix-up code that may have been speculatively prefetched from all instruction caches (e.g., the instruction cache 240 of FIG. 2) in the coherence domain. The initializer 120 may then flush and synchronize the code page 250 (block 630). After the cache flush and synchronization, the code page 250 is in Code State No. 4 in which the code page 250 may include safe fix-up code that is disabled for execution by the code executor 140. The fix-up code may be speculatively prefetched into the instruction cache 240 and potentially executed by the code executor 140. In particular, the fix-up code is configured to ensure that the processor system 200 enforces coherence and re-executes the cache line 270. For example, the fix-up code may execute a call instruction (e.g., br.call), perform a cache flush on the instruction cache 240 for the memory address corresponding to the cache line 270 (e.g., fc or fc.i), adjust the return address to point to the affected code, and execute a return (e.g., br.ret b0) to restore execution to the original code. The return instruction restoring execution to the same bundle that previously included the fix-up code in the instruction cache line 270 may then cause the new code to be fetched and executed as if the call to the fix-up code never occurred. Accordingly, the reclamation and initialization process 410 terminates and control proceeds to the code generation process 420. The reclamation and initialization process 410 may be performed by the core 210 and/or any other core and/or processor available in the processor system 200. Further, the reclamation and initialization process 410 may performed by the same core and/or a different core and/or processor from that processor that performs the code generation process 420.

In FIG. 8, the code generation process 420 begins with the code generator 130 generating and storing new code (block 710). For example, the code generator 130 may generate new instructions at a branch entry point, a subsequent memory location, and/or a memory location proximate to a subsequent branch entry point. After the code generator 130 generates and stores new code, the code page 250 is in Code State No. 5. In Code State No. 5, the code page 250 may include a combination of safe fix-up code and safe new code that are disabled for execution by the code executor 140. The code generator 130 may also update data structures configured to store extra code data such as metadata (block 720). The code generation process 420 terminates, and the code page 250 is in Code State No. 6 in which the code page 250 may include safe new code that is enabled for execution by the code executor 140. Unused portions of the code page 250 may include fix-up code to detect execution errors. Although the code page 250 may be in a safe state (e.g., Code State No. 6), the code page 250 may not be fully coherent because of speculative instruction-cache prefetching. Thus, an instruction-cache flush may be performed in response to detecting an incoherent instruction as described in detail below. To optimize the process 400, for example, if the code reclamation and initialization process 410 generates available code pages during idle time, then the code generation process 420 may be delayed until there is a need to generate new code in an available code page.

Referring back to FIG. 5, the code executor 140 executes the new code generated by the code generation process 420 (block 425). The use of fix-up code ensures coherence because the code executor 140 executes the safe code that is in the instruction cache 240 or fetches the safe code from the main memory (e.g., main memory 2030 of FIG. 9). If the code page 250 includes a coherent cache line (block 430), the process 400 proceeds to block 460 as described below. Otherwise, if the code page 250 includes an incoherent cache line, the code executor 140 calls the fix-up code to enforce cache coherency (block 440) and refetches the cache line for execution (block 450). An incoherent cache line may be a cache line that is prematurely prefetched into the code page 250 of the instruction cache 240 (e.g., incoherent instructions). For example, a cache line may be prefetched into the code page 250 but not used immediately or for a period of time. A cache line may be incoherent if the cache line was prefetched prior to the new code being generated and if that particular cache line is not refetched into the instruction cache 240. For example, the code executor 140 may execute the instruction bundles 360 or 370 of FIG. 4 to call the fix-up code (e.g., either br.call b1=fixup or brl.call b1=fixup, respectively). The fix-up code may verify that the code page 250 is enabled for execution, flush the verified code page 250, and return to the detected incoherent instructions as if the call to the fix-up code had never happened.

At block 460, the code executor 140 determines whether the code page 250 includes additional code to be executed. If the code executor 140 determines that the code page 250 includes additional code to be executed at block 460 then control returns to block 425. Otherwise, if the code executor 140 fails to detect additional code to be executed then the process 400 terminates. Alternatively, the process 400 may repeat continuously until, for example, one or more instructions halt the processor system 200 and/or power may be turned off. Thus, block 460 may be unnecessary, and control may return to block 425 directly from blocks 430 and 450.

Although the methods and apparatus disclosed herein are particularly well suited for processor systems implemented using the Intel® Itanium®0 technology, the methods and apparatus disclosed herein may be applied to other processor systems. For example, the methods and apparatus disclosed herein may be applied to a processor system configured to provide fix-up code executable under all conditions based either hardware behavior (e.g., capacity, conflict and/or snoop events causing flushes by hardware) and/or software restrictions (e.g., explicit cache flush instructions by software).

Figure 9:
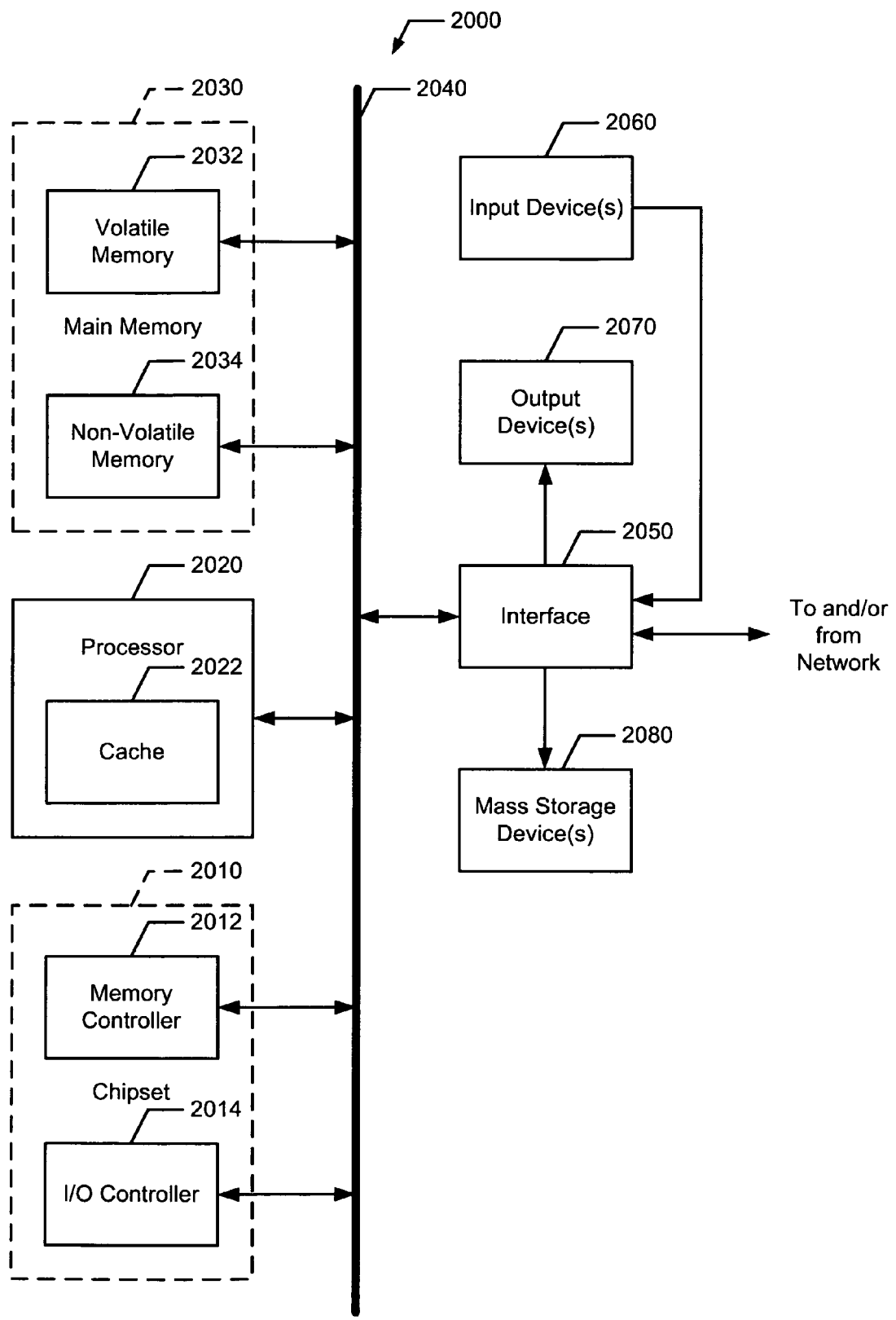
FIG. 9 is a block diagram representation of an example processor system that may be used to implement the example methods and apparatus described herein.

FIG. 9 is a block diagram of an example processor system 2000 adapted to implement the methods and apparatus disclosed herein. The processor system 2000 may be a desktop computer, a laptop computer, a notebook computer, a personal digital assistant (PDA), a server, an Internet appliance or any other type of computing device.

The processor system 2000 illustrated in FIG. 9 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors. For example, the processor 2020 may be implemented using one or more of the Intel® Pentium® technology, the Intel® Itanium® technology, Intel® Centrino™ technology, and/or the Intel® XScale® technology. In the alternative, other processing technology may be used to implement the processor 2020. The processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit a user to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 9 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
 initializing a memory region of an instruction cache to form an initialized memory region prior to generating new code associated with the initialized memory region;
 flushing and synchronizing the initialized memory region;
 generating coherence code associated with the initialized memory region in response to flushing and synchronizing the initialized memory region;
 generating the new code associated with the initialized memory region;
 executing at least one of the new code or the coherence code;

determining, in response to executing the at least one of the new code or the coherence code, if at least one cache line is incoherent due to at least one premature prefetch of the cache line; and refetching the cache line if the cache line is incoherent due to the at least one premature prefetch.

2. A method as defined in claim 1, wherein initializing the memory region to form the initialized memory region comprises disabling or removing old code from the memory region.

3. A method as defined in claim 1, wherein generating the coherence code comprises generating fix-up code or code to invoke fix-up code.

4. A method as defined in claim 1, wherein generating the coherence code comprises generating the coherence code at a branch entry point.

5. A method as defined in claim 1, wherein generating new code comprises generating new instructions to replace coherence code at a branch entry point, a subsequent memory location, or a memory location proximate to a subsequent branch entry point.

6. A method as defined in claim 1, wherein the memory region comprises a code page configured to store code or metadata.

7. A method as defined in claim 1, wherein the coherence code comprises a coherence bundle.

8. A machine accessible medium having instructions stored thereon, which when executed, cause a machine to:
   initialize a memory region of an instruction cache to form an initialized memory region prior to generating new code associated with the initialized memory region;
   flush and synchronize the initialized memory region;
   generate coherence code associated with the initialized memory region in response to flushing and synchronizing the initialized memory region;
   generate the new code associated with the initialized memory region;
   execute at least one of the new code or the coherence code;
   determine, in response to executing the at least one of the new code or the coherence code, if at least one cache line is incoherent due to at least one premature prefetch of the cache line; and
   refetch the cache line if the cache line is incoherent due to the at least one premature prefetch.

9. A machine accessible medium as defined in claim 8, wherein the instructions, when executed, cause the machine to initialize the memory region to form the initialized memory region by disabling or removing old code from the memory region.

10. A machine accessible medium as defined in claim 8, wherein the instructions, when executed, cause the machine to generate the coherence code by generating fix-up code or code to invoke fix-up code.

11. A machine accessible medium as defined in claim 8, wherein the instructions, when executed, cause the machine to generate the new code by generating new instructions to replace coherence code at a branch entry point, a subsequent memory location, or a memory location proximate to a subsequent branch entry point.

12. A machine accessible medium as defined in claim 8, wherein the memory region comprises a code page configured to store code or metadata.

13. A machine accessible medium as defined in claim 8, wherein the coherence code comprises a coherence bundle.

14. A machine accessible medium as defined in claim 8, wherein the machine accessible medium comprises one of a programmable gate array, application specific integrated circuit, erasable programmable read only memory, read only memory, random access memory, magnetic media, and optical media.

15. An apparatus comprising:
   an initializer to initialize a memory region of an instruction cache to form an initialized memory region prior to generating new code associated with the initialized memory region, the initializer to flush and synchronize the initialized memory region;
   a code generator to generate coherence code associated with the initialized memory region in response to flushing and synchronizing the initialized memory region, and to generate the new code associated with the initialized memory region; and
   a code executor to execute at least one of the new code or the coherence code, the code executor to determine, in response to executing the at least one of the new code or the coherence code, if at least one cache line is incoherent due to the at least one premature prefetch of the cache line, and refetching the cache line if the cache line is incoherent due to the at least one premature prefetch.

16. An apparatus as defined in claim 15, wherein the initializer is configured to disable or remove old code from the memory region.

17. An apparatus as defined in claim 15, wherein the code generator is configured to generate fix-up code or code to invoke fix-up code.

18. An apparatus as defined in claim 15, wherein the code generator is configured to generate new instructions to replace coherence code at a branch entry point, a subsequent memory location, or a memory location proximate to a subsequent branch entry point.

19. An apparatus as defined in claim 15, wherein the memory region comprises a code page configured to store code or metadata.

20. An apparatus as defined in claim 15, wherein the coherence code comprises a coherence bundle.

21. A processor system comprising:
   a dynamic random access memory (DRAM); and
   a processor coupled to the DRAM to:
      initialize a memory region of an instruction cache to form an initialized memory region prior to generating new code associated with the initialized memory region;
      flush and synchronize the initialized memory region;
      generate coherence code associated with the initialized memory region in response to flushing and synchronizing the initialized memory region;
      generate the new code associated with the initialized memory region;
      execute at least one of the new code or the coherence code;
      determine, in response to executing the at least one of the new code or the coherence code, if at least one cache line is incoherent due to at least one premature prefetch of the cache line; and
      refetch the cache line if the cache line is incoherent due to the at least one premature prefetch.

22. A processor system as defined in claim 21, wherein the processor is configured to disable or remove old code from the memory region.

23. A processor system as defined in claim 21, wherein the processor is configured to generate fix-up code or code to invoke fix-up code.

24. A processor system as defined in claim 21, wherein the processor is configured to generate new instructions to replace coherence code at a branch entry point, a subsequent memory location, or a memory location proximate to a subsequent branch entry point.

25. A processor system as defined in claim 21, wherein the memory region comprises a code page configured to store code or metadata.

26. A processor system as defined in claim 21, wherein the coherence code comprises a coherence bundle.

27. A method as defined in claim 1, further comprising determining that the premature prefetch of the cache line occurs prior to generating the coherence code to cause the at least one cache line to be incoherent.

28. A machine accessible medium as defined in claim 8, wherein the instructions, when executed, cause the machine to determine that the premature prefetch of the cache line occurs prior to generating the coherence code to cause the at least one cache line to be incoherent.

29. An apparatus as defined in claim 15, wherein the code executor is configured to determine that the premature prefetch of the cache line occurs prior to generating the coherence code to cause the at least one cache line to be incoherent.

30. A processor system as defined in claim 21, wherein the processor is configured to determine that the premature prefetch of the cache line occurs prior to generating the coherence code to cause the at least one cache line to be incoherent.

* * * * *